(12) United States Patent
Brown et al.

(10) Patent No.: US 8,653,968 B2
(45) Date of Patent: Feb. 18, 2014

(54) SYSTEMS AND METHODS FOR PREDICTIVE BUILDING ENERGY MONITORING

(75) Inventors: Matthew Brown, Lausanne (CH); Christopher Barrington-Leigh, Vancouver (CA); Christopher Porter, Vancouver (CA); Neil Gentleman, Vancouver (CA)

(73) Assignee: Pulse Energy Inc., Vancouver, B.C. (CA)

( * ) Notice: Subject to any disclaimer, the term of this patent is extended or adjusted under 35 U.S.C. 154(b) by 894 days.

(21) Appl. No.: 12/646,764

(22) Filed: Dec. 23, 2009

(65) Prior Publication Data

US 2011/0153103 A1     Jun. 23, 2011

(51) Int. Cl.
*G08B 1/08* (2006.01)

(52) U.S. Cl.
USPC ............... 340/539.3; 340/636.16; 340/657; 700/291; 700/276; 700/286; 702/61; 705/7.11; 705/412

(58) Field of Classification Search
USPC .......... 340/539.3, 636.16, 657; 700/291, 276, 700/286; 702/61; 705/7.11, 412
See application file for complete search history.

(56) References Cited

U.S. PATENT DOCUMENTS

| | | | |
|---|---|---|---|
| 2005/0192915 A1* | 9/2005 | Ahmed et al. | 706/21 |
| 2007/0244604 A1* | 10/2007 | McNally | 700/291 |
| 2010/0305889 A1* | 12/2010 | Tomlinson et al. | 702/62 |
| 2011/0029341 A1* | 2/2011 | Muse et al. | 705/7 |
| 2011/0066299 A1* | 3/2011 | Gray et al. | 700/291 |

* cited by examiner

*Primary Examiner* — Andrew Bee
(74) *Attorney, Agent, or Firm* — Schwabe, Williamson & Wyatt

(57) ABSTRACT

A system and method for predictive modeling of building energy consumption provides predicted building energy load values which are determined using kernel smoothing of historical building energy load values for a building using defined scaling factors for scaling predictor variables associated with building energy consumption. Predictor variables may include temperature, humidity, windspeed or direction, occupancy, time, day, date, and solar radiation. Scaling factor values may be defined by optimization training using historical building energy load values and measured predictor variable values for a building. Predicted and measured building energy load values are compared to determine if a preset difference threshold has been exceeded, in which case an alert signal or message is generated and transmitted to electronically and/or physically signal a user. The building energy monitoring system may be integrated with a building automation system, or may be operated as a separate system receiving building energy and predictor variable values.

30 Claims, 9 Drawing Sheets

SYSTEMS AND METHODS FOR PREDICTIVE BUILDING ENERGY MONITORING

1. TECHNICAL FIELD

The present invention relates generally to systems and methods for building energy management. More specifically, the present inventive systems and methods relate to building energy monitoring using predicted building energy use values.

2. BACKGROUND OF THE INVENTION

As the desire to improve energy efficiency has become more widespread, a need for effective methods and infrastructure to monitor and control the consumption of energy by buildings of all sizes has become of increasing importance, and for large buildings in particular. As a result, building management systems have become increasingly common. Building management systems typically provide for the measurement and control of building energy systems, including the measurement of consumption of various energy-related resources by building systems including for example electrical energy, natural gas, thermal energy, steam energy, or water usage, through the use of electronic and/or computerized building energy meters. Such building energy meters then provide building energy consumption data to an automated or computer controlled building management system.

In addition to the adoption of automated building management systems to measure and control building systems and building energy consumption, in order to improve building energy efficiency, it has also become of interest to provide predicted or expected typical values for building energy loads for a particular building, in order to enable more accurate and efficient planning, management, and fault detection of energy consumption. To that end, multiple approaches have been made towards the determination of predicted or typical building energy load values for a building, which have been adapted to attempt to take into account the effect of various parameters that may influence building energy consumption, and therefore the building energy load values that are predicted.

Certain of the known approaches to determining predicted or typical values for building energy load have been based on the use of detailed physical building models to calculate the predicted or typical building energy load values for given environmental or predictor variables such as temperature, humidity, wind, occupancy, etc. Such detailed physical building models may typically model heating and cooling behavior and associated energy consumption for a building by constructing energy consumption models for the building including consideration of many building-specific design parameters, such as dimensions, materials, orientation, window coverage, insulation, HVAC systems, and lighting, for example, in addition to consideration of the effect of external environmental variables such as temperature, humidity and wind, for example. However, such physical building models may be very complex, and as a result typically require extensive building-specific evaluation and analysis of design factors by skilled professionals to produce accurate models. Therefore, the use of such physical building model methods to generate predicted or typical building energy load values may be impractical for use on multiple dissimilar buildings, due to the computational and economic cost of developing such models for each building. This approach may also be unsuitable for use in connection with buildings for which detailed design data is not available or impractical to obtain.

Other known approaches to determining predicted or typical values for building energy loads have been based on numerical modeling tools that attempt to relate previously measured building energy load values and associated variations in external environmental variables such as temperature, humidity and wind, to provide predicted or typical building energy load values corresponding to observed or predicted environmental variables. One such approach makes use of linear or higher order polynomial functions that attempt to fit measured historical building energy load values to measured values of environmental variables, after which the resulting polynomial model may be applied to environmental variable values for the predicted conditions, to obtain a predicted or typical value for building energy loads. However, models based on such polynomial functions may not provide a good fit to building energy load data, in particular low order polynomials may be unable to follow step changes and higher order polynomials may overfit to noise. Also, the use of polynomial functions may result in poor estimated or predicted values for variables outside the range of training datasets.

Other known numerical modeling approaches are based on the use of neural networks to fit historical building energy load and predictor variable data for a building, to enable prediction of building energy load values for given predictor variable value inputs. However, the use of neural network techniques may require complex computation of many parameters in order to fit or learn from a historical building energy load dataset. This approach may further be prone to unstable or erroneous prediction behavior when used to produce predicted building energy load values corresponding to predictor variable values which are outside the range of the historical dataset used to fit or train the neural network system. Also, the use of neural network techniques may typically involve the use of a large number of parameters relative to their expressive power, which may contribute to estimation or prediction errors related to overfitting in some applications, depending upon the size and/or range of the historical building energy load dataset available to use in training or initializing of a neural network model.

Accordingly, a need exists for improved methods and systems for building energy monitoring such as may be desirably adaptable for use with multiple buildings and without the requirement of extensive computational resources.

3. SUMMARY OF THE INVENTION

It is an object of the present invention to provide a system and method for predictive building energy monitoring.

According to another object of the present invention, a system and method for generating an alert based on predictive building energy monitoring is provided.

According to yet a further object of the invention, a computer readable medium and computer implemented method for predicting building energy load values is provided.

A computer readable medium according to an embodiment of the present invention is provided, comprising executable instructions to receive historical building energy load values and corresponding historical predictor variable data comprising values for one or more predictor variables; define a scaling factor for each said predictor variable by cross-validation error minimization for said historical building energy load values using said corresponding historical predictor variable values scaled by said scaling factor values; receive measured building energy load values measured by at least one building energy meter; receive measured predictor variable values corresponding to the measured building energy load values from a predictor variable datasource; determine a predicted building energy load value by kernel smoothing of one or more nearest neighbor historical building energy load values using said defined scaling factors for scaling each said predictor variable; compare said predicted building energy load value with said measured building energy load value to determine if an alert threshold level is exceeded; and to transmit an alert signal to a user when said alert threshold level is exceeded.

A computer implemented method of building energy monitoring is provided according to another embodiment of the invention, the method comprising receiving historical building energy load values and corresponding historical predictor variable data comprising values for one or more predictor variables; defining a scaling factor for each predictor variable by cross-validation error minimization for the historical building energy load values using corresponding historical predictor variable values scaled by said scaling factors; receiving measured building energy load values measured by at least one building energy meter; receiving measured predictor variable values corresponding to the measured building energy load values from a predictor variable datasource; determining a predicted building energy load value by kernel smoothing using one or more nearest neighbor historical building energy load values and using the defined scaling factors for scaling each predictor variable; comparing the predicted building energy load value with the measured building energy load value to determine if an alert threshold level is exceeded; and transmitting an alert signal to a user when the alert threshold level is exceeded.

According to a further embodiment of the invention, a computer implemented method of building energy monitoring is provided comprising: receiving historical building energy load values and corresponding historical predictor variable data comprising values for one or more predictor variables; receiving scaling factor values for each said predictor variable; receiving measured building energy load values measured by at least one building energy meter; receiving measured predictor variable values corresponding to the measured building energy load values from a predictor variable datasource; determining a predicted building energy load value by kernel smoothing using one or more nearest neighbor historical building energy load values and using said scaling factor values for scaling each said predictor variable; comparing said predicted building energy load value with said measured building energy load value to determine if an alert threshold level is exceeded; and transmitting an alert signal to a user when said alert threshold level is exceeded.

Further embodiments of the invention will become apparent when considering the drawings in conjunction with the detailed description.

4. BRIEF DESCRIPTION OF THE DRAWINGS

The system and method of the present invention will now be described with reference to the accompanying drawing figures, in which.

Figure 1:
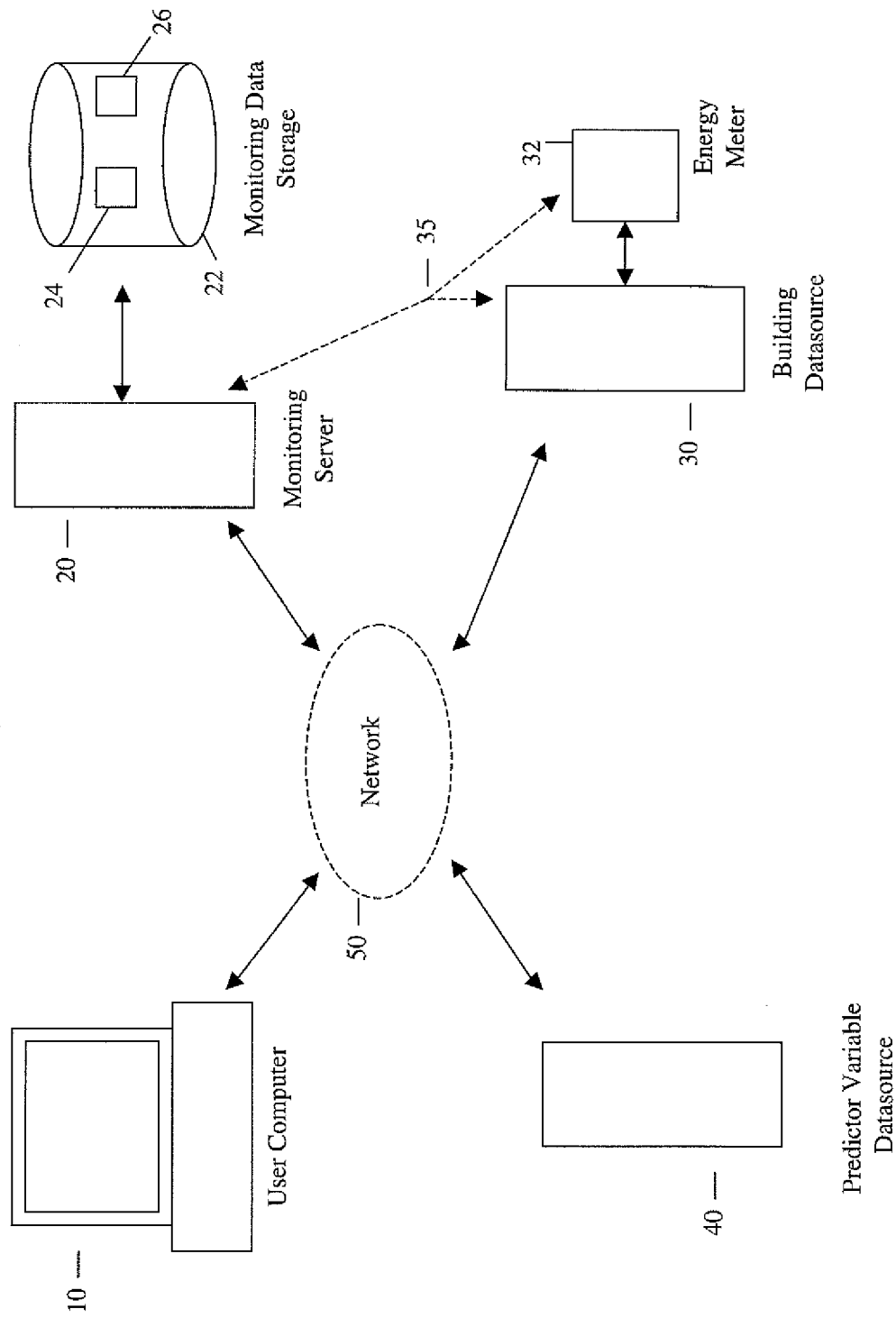
FIG. 1 illustrates an exemplary networked operating environment for implementing an embodiment of the present invention.

FIGS. 7A, 7B, 7C, and 7D illustrate an exemplary graphical representation of a scaling factor learning process in association with an embodiment of the present invention.

Like reference numerals refer to corresponding parts throughout the several views of the drawings. The sizes and relative positions of elements in the drawings are not necessarily drawn to scale. Further, the particular shapes of the elements as drawn are not intended to convey any information regarding the actual shape or form of the elements, and have been solely selected for ease of recognition in the drawings.

5. DETAILED DESCRIPTION OF THE INVENTION

FIG. 1 illustrates an exemplary networked operating environment in which an embodiment of the present invention may be implemented. The networked environment includes a user computer 10 connected to a communication network 50, which may include one or more of: a local area network, intranet, wide area network, world wide web (WWW), or the global Internet, for example, such that user computer 10 may communicate with other computers similarly connected to network 50. Other computers connected to network 50 may include a building monitoring server 20, building datasource server 30 connected to building energy meter 32, and a predictor variable datasource server 40, which may each communicate with any other computer connected to the network 50. Optionally, building datasource server 30 may connect directly to building monitoring server 20, such as by connection 35, for example. Additionally, in a further optional embodiment, building energy meter 32 may connect directly to building monitoring server such as by connection 35, or may connect to building datasource server 30 and thereby to either computer network 50 or to building monitoring server 20 by connection 35, for example. User computer 10 includes standard computing components for transmitting and receiving data to and from other computers connected to the user computer 10 through network 50, including receiving and transmitting webpage and/or web application data by commonly known methods and techniques such as hypertext markup language ("HTML"), extensible hypertext markup language ("XHTML"), extensible markup language ("XML"), wireless markup language ("WML") or other available data formats which may incorporate structural definitions into a data file, for example.

Building monitoring server 20 includes standard computing components for transmitting and/or receiving data, including building monitoring data, webpages, web application data such as HTML, XHTML, XML, and/or WML and the like, to and from other computers connected over the computer network 50 or other connection 35, including user computer 10, building datasource 30 and predictor variable datasource 40, and optionally also building energy meter 32. In a particular embodiment, building monitoring server 20 includes or is connected to at least one monitoring data storage repository 22 for storing building monitoring data which may be transmitted or received to or from other computers or devices which may be connected to building monitoring server 20. Storage repository 22 may comprise a conventional data storage device such as a hard disk or solid-state memory located with and connected directly to building monitoring server 20, or may alternatively comprise a remote data storage repository connected to building monitoring server 20, such as a network storage appliance, for example. Monitoring data storage repository 22 may comprise stored building energy load data 24, and stored predictor variable data 26, for example. In one embodiment, stored building energy load data 24 may comprise one or more of: historical measured building energy load values, current measured building energy load values, and predicted building energy load values, for example. Historical and current measured building energy load values may be received by monitoring server 20 from one or more of: a building datasource server 30, a building energy meter 32, and/or another suitable source of measured building energy load values, for example, and may be received by building monitoring server 20 such as through computer network 50 and/or connection 35. Predicted building energy load values comprised in building energy load data 24 may be calculated such as by monitoring server 20, for example. In another embodiment, stored predictor variable data 26 may comprise one or more of: historical predictor variable values, and current predictor variable values. Such predictor variable values may be received by monitoring server from predictor variable datasource server 40 and/or another suitable source of predictor variable data, and may be received by building monitoring server 20 such as through computer network 50 or connection 35, for example.

Building datasource computer 30 includes standard computing components for sending and receiving building energy data to and from other computers connected to network 50. In one embodiment, building datasource 30 is connected to at least one building energy meter 32 which provides measured building energy load data for one or more buildings to building datasource 30. Building datasource 30 may also comprise a building energy data storage repository (not shown) for storing measured building energy load data, which may comprise a conventional data storage device such as a hard disk or solid-state memory located with and connected directly to building datasource 30, or may comprise a remote data storage facility connected building datasource 30. Such stored building energy load data may comprise at least one of past historical building energy load values, and current measured building energy load values. In one embodiment, building datasource 30 may comprise a building management or building automation system, for example, and may be connected to one or more building energy meters 32 corresponding to one or more buildings. In another embodiment, building datasource 30 may comprise a computer or server connected to and/or integrated with a smart building energy meter 32. Alternatively, building datasource 30 may comprise a utility company computer or system, which may be connected to and/or communicate with one or more (typically many) smart building energy meters 32, to provide measured building energy load data corresponding to one or more buildings, for example.

Predictor variable datasource computer 40 includes standard computing components for sending and receiving predictor variable data comprising values for one or more predictor variables to and from other computers connected to network 50. In one embodiment, predictor variable datasource 40 is connected to at least one predictor variable data storage repository (not shown) for storing predictor variable value data. Such predictor variable data storage repository may comprise any suitable data storage device such as a hard disk or solid-state memory located with and connected directly to predictor variable datasource 40, or may comprise a remote data storage facility connected to predictor variable datasource 40. Predictor variable datasource 40 may store predictor variable data comprising past historical predictor variable values, as well as current measured predictor variable values, for at least one geographical location corresponding to at least one building, such as for a city, town, or region in which one or more buildings of interest are located, for example. In one embodiment, predictor variable datasource 40 may comprise a weather data server for a public weather service, such as a government and/or private weather service which may make historical and current predictor variable values for multiple geographical locations available to the public, such as over network 50, for example. In another embodiment, predictor variable datasource 40 may comprise a computer server for a private or building-specific weather station, and may be located on and/or adjacent to a building of interest, for example, to measure and store predictor variable values from such weather station. In another embodiment, predictor variable datasource 40 may also comprise a computer server for a building specific occupant monitoring system, and may be located on and/or adjacent to a building of interest, for example, to measure and store occupancy variable values from such building. In another embodiment, predictor variable datasource 40 may comprise of any suitable combination of data sources providing predictor variable data.

Figure 2:
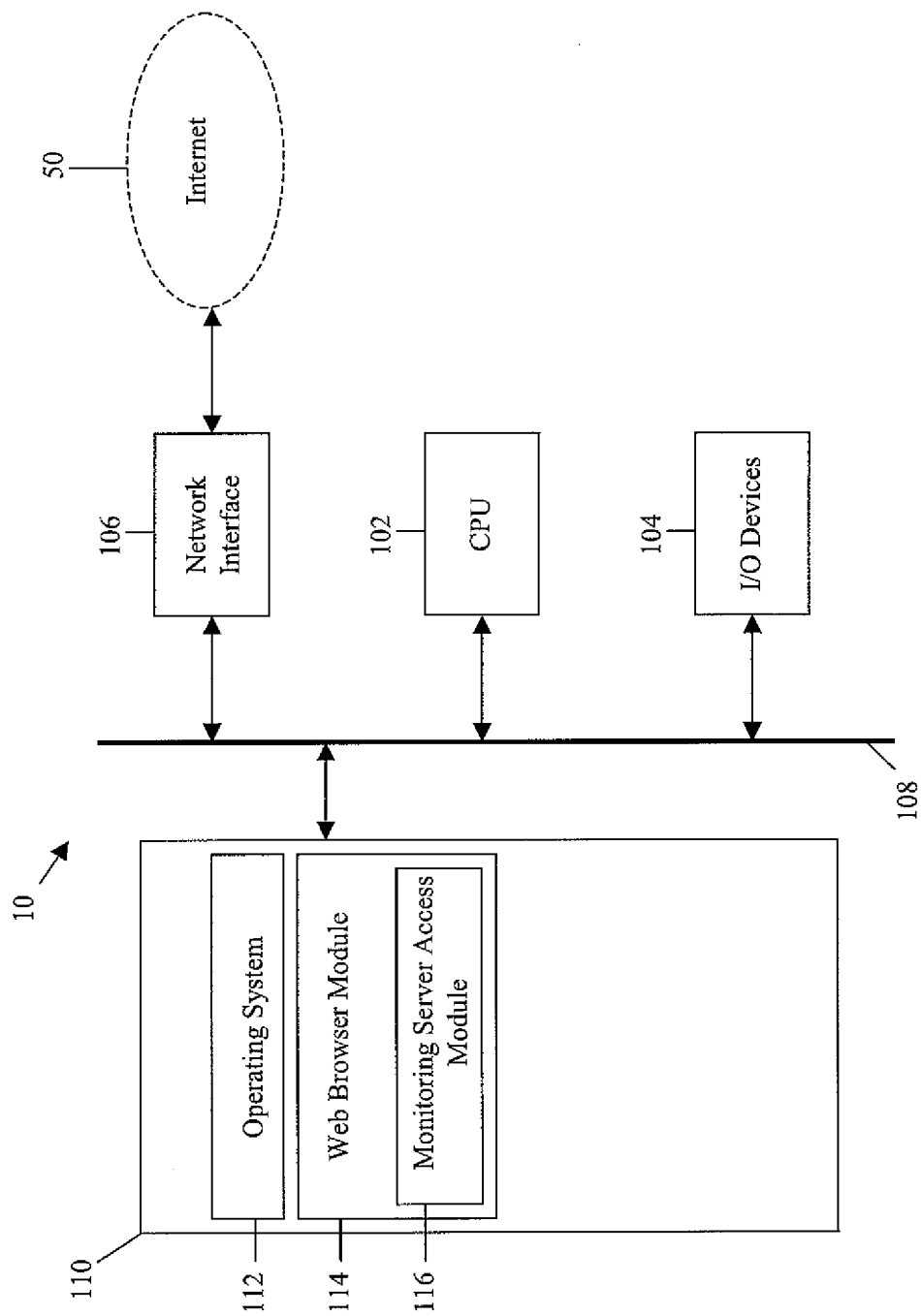
FIG. 2 illustrates an exemplary user computer architecture configured according to an embodiment of the invention.

FIG. 2 illustrates an exemplary computer architecture for a user computer 10 configured in accordance with an embodiment of the invention. User computer 10 includes standard components, including a central processing unit 102 and input/output devices 104, which are linked by a bus 108. Input/output devices 104 may comprise a keyboard, mouse, touch screen, monitor, printer, and the like, for example. Network interface 106 is also connected to the bus 108. Network interface 106 provides connectivity to a network 50, such as the exemplary computer network 50 described above, thereby allowing the computer 10 to operate in a networked environment. Also connected to the bus 108 is a computer-readable memory 110. The memory 110 stores executable instructions to implement functions of the present invention. The computer-readable memory 110 may comprise any available computer-readable media or device that can be accessed by computer 10.

In an embodiment of the present invention, one or more of the following program modules and data files may be stored in the memory 110 of the computer 10: an operating system module 112, a web browser module 114 and a monitoring server access module 116.

Operating system module 112 may be suitable for controlling the operation of a networked user or analysis computer, and in particular may comprise instructions for handling various system services, such as file services or for performing hardware dependant tasks. Operating system module 112 may also comprise instructions for standard computer operation, including receiving input from input devices such as a keyboard or mouse, and for displaying output in a graphical format on a monitor, for example.

Operating system module 112 may comprise any known executable operating system instructions, such as may be suitable for controlling the general operations of networked user computer 10, and in particular may comprise instructions for handling various system services, such as file services or for performing hardware dependent tasks. Operating system module 112 may also comprise instructions for standard computer operation, including receiving input from input devices such as a keyboard or mouse, and for displaying output in a graphical format on a monitor, for example. In one embodiment, operating system module 112 may comprise one or more known proprietary or open-source computer operating systems, such as for example, Windows™, MacOS™, UNIX™ or Linux™ operating systems.

Web browser module 114 comprises instructions for browsing webpages and/or viewing web applications provided by a web server or other source, such as instructions for requesting and receiving a webpage and/or web application from a monitoring server and displaying the webpage and/or web application on a display device such as a monitor. Web browser module 114 also comprises instructions for receiving input from a user's interaction with a webpage and/or web application, such as from input devices like a keyboard and mouse for example, and for transmitting such user input to a web server. Web browser module 114 may also comprise instructions for executing processing commands comprised in webpages and/or web applications.

Monitoring server access module 116 comprises instructions for authenticating and/or verifying a user's identity to building monitoring server 20, and to receive and display one or more web application pages transmitted by building monitoring server 20 as part of a building energy monitoring web application, for example. Monitoring server access module 116 may also comprise instructions to transmit input from a user operating user computer 10, and/or building energy management data input on user computer 10 back to monitoring server 20, for example. In one embodiment, monitoring server access module 116 may further comprise instructions for displaying multiple building energy monitoring interface displays received from monitoring server 20, such as may be desirable to display different aspects of building energy data, for example. In a particular embodiment, monitoring server access module 116 may also comprise instructions for receiving one or more alert messages from monitoring server 20, and for displaying and/or otherwise transmitting such alert messages to a user of user computer 10 to, for example, notify a user regarding a building energy monitoring alert condition.

The above-described program modules incorporate instructions to implement processing operations associated with the present invention. Various embodiments of the processing operations of the above-described program modules are described below with reference to FIG. 5. The modules stored in memory 110 are exemplary, and additional modules can be included. It should be appreciated that the functions of the presented modules may be combined. In addition, a function of a module need not be performed on a single machine. Instead, the function may be distributed across a network such as network 50, to one or more other computers or devices if desired. It is the functions of the invention that are significant, not where they are performed or the specific manner in which they are performed.

Figure 3:
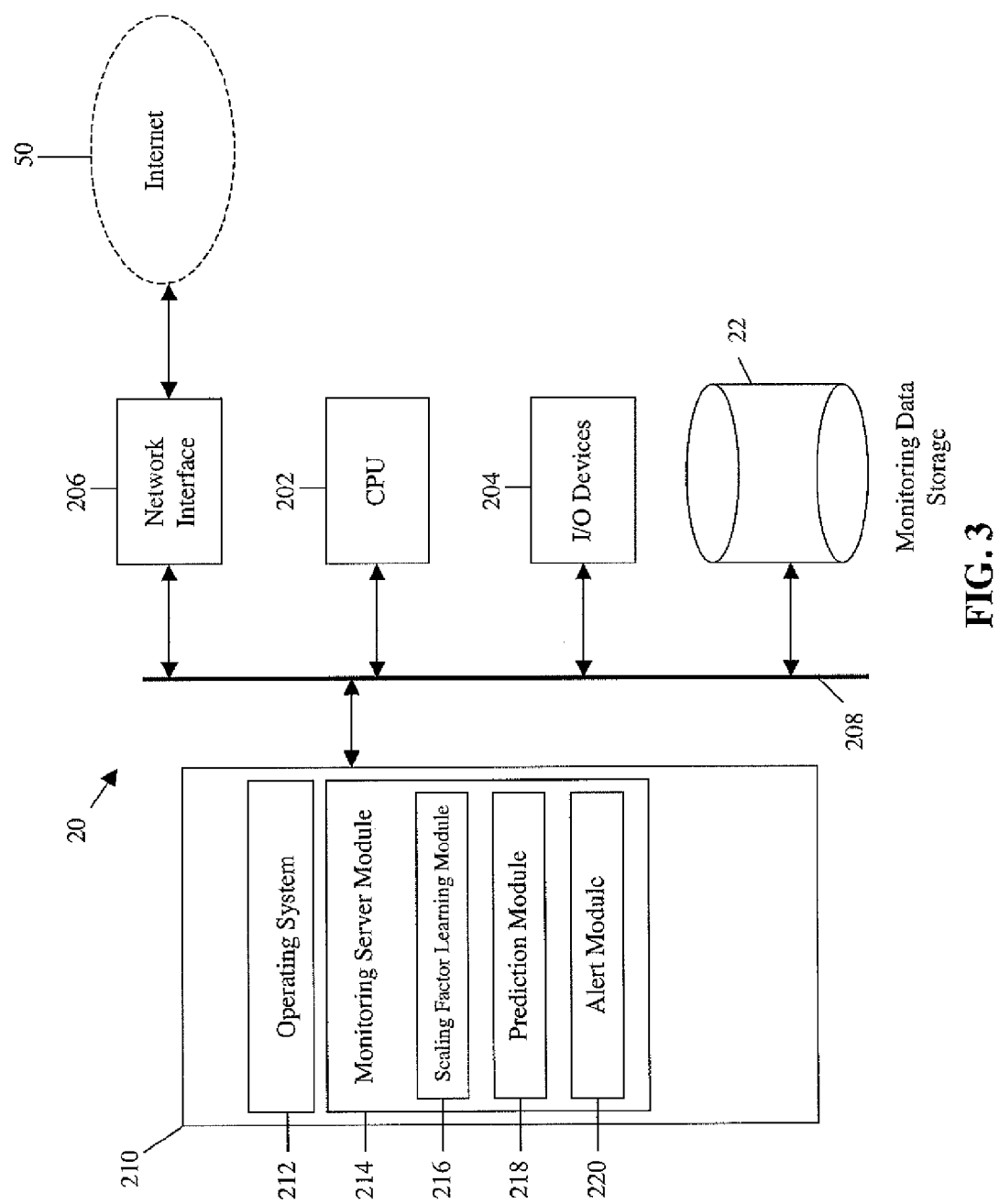
FIG. 3 illustrates an exemplary monitoring server computer architecture configured according to an embodiment of the invention.

FIG. 3 illustrates an exemplary computer architecture for a building monitoring server computer, such as monitoring server 20 as illustrated in the computer system of FIG. 1, configured in accordance with an embodiment of the present invention. Monitoring server computer 20 includes standard components, including a central processing unit 202 and input/output devices 204, which are linked by a bus 208. Input/output devices 204 may comprise a keyboard, mouse, touch screen, monitor, printer, and the like, for example. Network interface 206 is also connected to the bus 208. Network interface 206 provides connectivity to a network 50, such as the exemplary computer network 50 described above, thereby allowing the monitoring server computer 20 to operate in a networked environment. Monitoring server 20 also comprises a monitoring data storage repository 22 capable of storing one or more of: building energy load data and/or predictor variable data, for example. As described above, monitoring data storage repository 22 may comprise a conventional data storage device such as a hard disk or solid-state memory located with and connected directly to monitoring server 20 such as by bus 208 as shown in FIG. 3, or may alternately comprise a remote data storage facility accessibly connected to monitoring server 20. Connected to the bus 208 is a computer-readable memory 210. The memory 210 stores executable instructions to implement functions of the present invention. Computer-readable memory 210 may comprise any available computer-readable media or device that can be accessed by the monitoring server computer 20.

In an embodiment of the invention, one or more of the following program modules and data files may be stored in memory 210 of monitoring server computer 20: an operating system module 212, a monitoring server module 214, a scaling factor learning module 216, a prediction module 218 and an alert module 220.

Similar to module 112 described above, operating system module 212 may comprise any known executable operating system instructions, such as may be suitable for controlling the general operations of networked monitoring server 20, and in particular may comprise instructions for handling various system services, such as file services or for performing hardware dependent tasks. Operating system module 212 may also comprise instructions for standard computer operation, including receiving input from input devices such as a keyboard or mouse, and for displaying output in a graphical format on a monitor, for example. In one embodiment, operating system module 212 may comprise one or more known proprietary or open-source computer operating systems, such as Windows™, MacOS™, UNIX™ or Linux™ operating systems. In a particular embodiment, operating system module 212 may comprise a Linux™ operating system, for example.

Monitoring server module 214 comprises instructions for transmitting and receiving building energy data to and from other computers connected to monitoring server 20 such as by computer network 50 and/or other data connections such as connection 35, for example. In particular, monitoring server module 214 comprises instructions for receiving historical and current measured building energy load values corresponding to one or more buildings, such as from one or more building datasources 30 and/or one or more building energy meters 32, for example. Monitoring server module 214 also comprises instructions for receiving historical and current predictor variable values corresponding to one or more geographical locations related to one or more buildings, such as from one or more predictor variable datasource 40, for example.

Monitoring server module 214 also comprises instructions for transmitting and receiving building energy to and from user computer 10 over computer network 50. In particular, monitoring server module 214 may comprise instructions to provide webpages and/or web application data to user computer 10 including at least one of measured building energy load values and predicted building energy load values, for example. In one embodiment, monitoring server module 214 may comprise instructions for providing web server functionality such as to interactively transmit building energy management data to user computer 10 in the form of one or more web application interface displays to compare measured and predicted building energy load values for one or more buildings. Optionally monitoring server 214 may also receive building energy data from user computer 10 such as may be input by a user of computer 10, for example. In a particular embodiment, monitoring server module 214 may also comprise instructions to transmit one or more building energy alert messages to user computer 10 such as alert messages in response to a comparison of measured building energy load values with predicted building energy load values, for example. In one embodiment, monitoring server module 214 may additionally optionally comprise instructions to transmit such alert messages to other computers and/or devices over a communication network such as exemplary network 50, in addition to or in place of user computer 10, for example.

In another embodiment, monitoring server module 214 may additionally comprise instructions for storing at least one of: historical building energy load values, historical predictor variable values, current measured building energy load values, predicted building energy load values and current predictor variable values. Monitoring server module 214 may store such instructions in monitoring data storage repository 22. In one embodiment, monitoring server module 214 may comprise instructions to store historical and/or current building energy load values and/or predictor variable values in monitoring data storage repository 22 as such values are received by monitoring server 20, such as from other computers over network 50, for example. Monitoring server module 214 may also comprise instructions to store predicted building energy load values in monitoring data storage repository 22 as they are calculated by monitoring server 20, or alternatively as they are transmitted to a user computer such as part of a web application page, for example.

Scaling factor learning module 216 comprises instructions for learning or determining a scaling factor value for each of multiple predictor variables, to optimize prediction of building energy load values by cross-validation error minimization of historical building energy load values using historical predictor variable values received by monitoring server 20. In particular, scaling factor learning module 216 comprises instructions for determining a scaling factor value for each of multiple predictor variables by cross validation to iteratively minimize the difference between predicted and measured historical building energy load values, and for determining predicted values for said historical building energy loads calculated by kernel smoothing nearest neighbor values of historical building energy loads using corresponding historical predictor variable values scaled or weighted according to the learned scaling factor values. Exemplary predictor variables may comprise one or more of: time, day, date, temperature, humidity, wind speed, wind direction, solar radiation and occupancy. In a particular embodiment, scaling factor learning module 216 may comprise instructions to define a training data set of historical measured building energy load values and corresponding historical predictor variable values as well as a validation data set of historical measured building energy load values and corresponding historical predictor variable values. Scaling factor learning module 216 may also comprise instructions to determine a scaling factor value for each of multiple predictor variables by calculating and employing a root mean squared (rms) error function defining the error between measured historical building energy loads in the validation data set and predicted building energy load values calculated by kernel smoothing of historical building energy load values within the training data set using historical predictor variable values that are weighted or scaled according to the scaling factor values. The rms error function may be minimized by using multiple successive iterations to vary the scaling factor values. For example, the rms error function for the difference between historical measured building energy load values and corresponding calculated predicted building energy load values may be expressed by:

$$e_{rms} = \left( \frac{1}{N_S} \sum_{i \in S} (y_i - \hat{y}_i)^2 \right)$$

where S is the validation data set of historical building energy load values, $y_i$ is the historical measured building energy load value, and $\hat{y}_i$ is the corresponding predicted building energy load value.

In such case, monitoring server module 214 may comprise instructions to optimize the learned scaling factor values by iteratively minimizing the rms error function using the Levenberg-Marquardt optimization algorithm for varying the learned scaling factor values for subsequent iterations of the scaling factor learning process. Alternatively, other suitable known optimization algorithms may be implemented by scaling factor learning module 216 for iteratively optimizing learned scaling factor values.

In one embodiment, scaling factor learning module 216 also comprises instructions for calculating predicted historical building energy load values by kernel smoothing of historical measured building energy load values using multiple historical predictor variable values that are scaled by the scaling factor values. A unit Gaussian kernel function may be used in such case. The predicted historical building energy load values may then be calculated using a weighted average of historical measured building energy load values. For example, a predicted building energy load value may be calculated according to the equation:

$$\hat{y} = \frac{\sum_i k(x, x_i) y_i}{\sum_i k(x, x_i)}$$

where $\hat{y}$ is the calculated predicted building energy load value for the corresponding values of predictor variables in vector x, $y_i$ are the measured historical building energy load values for the arbitrarily selected number of nearest neighbors with predictor variable vectors $x_i$ that have been scaled by the scaling factors, and $k(x, x_i)$ is the unit kernel function.

In such embodiment, the scaling factor learning module 216 may also comprise instructions for using a suitable known k-dimensional (or k-d) tree such as a "best-bin first" k-d tree algorithm, where the k dimensions are those of the predictor variables, to determine an arbitrary number of nearest neighbor historical building energy load values and the distances to those values from the predictor variables associated with the prediction in the space of the scaled predictor variables.

In another embodiment, scaling factor learning module 216 comprises instructions for periodically redetermining a training data set and a validation data set from historical measured building energy load values and historical predictor variable values received by monitoring server 20 for one or more buildings. In such an embodiment, following such periodic redetermination of a training data set and validation data set, scaling factor learning module 216 also comprises instructions for relearning or determining scaling factor values for each predictor variable using the redetermined training data set and validation data set, to periodically update the scaling factor learning process and thereby provide updated scaling factor values for each predictor variable for each of one or more buildings, for example. In a particular embodiment, the scaling factor learning module 216 may comprise instructions to receive a determination of the training data set and validation data set of historical measured building energy load values and predictor variable values from user computer 10, such as may be input by a user of computer 10, for example.

Prediction module 218 comprises instructions for calculating a current predicted building energy load value (also known as a typical building energy load value) which corresponds to current measured predictor variable values received from predictor variable datasource 40, and using historical building energy load and predictor variable values. In particular, prediction module 218 comprises instructions to calculate current predicted building energy load values by kernel smoothing of nearest neighbor historical building energy load using historical predictor variable values scaled by the learned scaling factor values. Prediction module 218 may comprise instructions to calculate current predicted (or typical) building energy load values for one or more buildings for which historical building energy load and predictor variable values are stored by monitoring server 20. Prediction module 218 may also comprise instructions for periodically calculating new current predicted building energy load values for one or more buildings, such as to provide regularly updated predicted (or typical) building energy load values, such as for ongoing regular monitoring of building energy consumption of one or more buildings, for example.

In one embodiment, similar to as described above in reference to scaling factor learning module 216, prediction module 218 comprises instructions for calculating a predicted or typical building energy load value according to the equation:

$$\hat{y} = \frac{\sum_i k(x, x_i) y_i}{\sum_i k(x, x_i)}$$

where $\hat{y}$ is the calculated predicted building energy load value for the corresponding values of predictor variables in vector x, $y_i$ are the measured historical building energy load values for the arbitrarily selected number of nearest neighbors with predictor variable vectors $x_i$ that have been scaled by the scaling factors, and $k(x, x_i)$ is the unit kernel function. In such an embodiment, the kernel function may comprise a unit Gaussian kernel. Also in such an embodiment, the prediction module 218 may further comprise instructions for using a suitable known k-dimensional (or k-d) tree such as a "best-bin first" k-d tree algorithm to determine an arbitrary number of nearest neighbor values of historical energy load values and nearest neighbour distances used in the kernel smoothing calculation of the current predicted or typical building energy load value which corresponds to the current measured predictor variable values for a building.

Prediction module 218 may also comprise instructions to calculate a series of predicted or typical building energy load values for one or more buildings, spaced over a period of time, and to relate the series of predicted values for each building to form a predicted building energy load curve, also referred to as a typical building energy load curve. The prediction module 218 may also comprise instructions to correlate such typical building energy load curve to a series of measured building energy load values such as may be received from building datasource 30, and may comprise measured energy load values for one or more buildings over a period of time. Accordingly, prediction module 218 may thereby include instructions to provide a typical building energy load curve comprising calculated predicted values using kernel smoothing of nearest neighbor historical building energy load values, and a corresponding actual building energy load curve comprising current measured building energy load values, such as for comparison of such typical curve and actual curve values. In one embodiment, prediction module 218 may comprise instructions to provide such typical and actual building energy load curves to a user computer 10, such as by using monitoring server module 214 to provide the typical and actual curves to a user computer 10 in the form of a webpage and/or a web application interface, for example.

Alert module 220 comprises instructions to compare predicted or typical building energy load values against measured or actual building energy load values to determine the difference between predicted and measured building energy load or consumption for one or more buildings. Alert module 220 also comprises instructions to determine if the difference between predicted and measured building energy load values exceeds a predetermined alert threshold. If the alert threshold is exceeded, alert module 220 further comprises instructions to generate an alert signal or message to be transmitted to one or more users to alert them regarding the energy load status of one or more buildings. In one embodiment, alert module 220 may comprise instructions to transmit an alert signal and/or message to a user computer 10, such as by using monitoring server module 214 to provide the alert signal and/or message to user computer 10 in the form of a webpage and/or a web application interface, for example. In another embodiment, alert module 220 may comprise instructions to transmit an alert signal and/or message to one or more users using a telecommunications network such as by transmitting a signal and/or message through an SMS message to a mobile device, by transmitting and email message, by paging a pager device, by placing a telephone call, or other suitable known means for transmitting an alert signal and/or message to a user. In one embodiment, the alert signal may comprise one or more of: an electrical impulse, an audible sound, a mechanical force, a movement of an object, and a visible display, for example.

Figure 4:
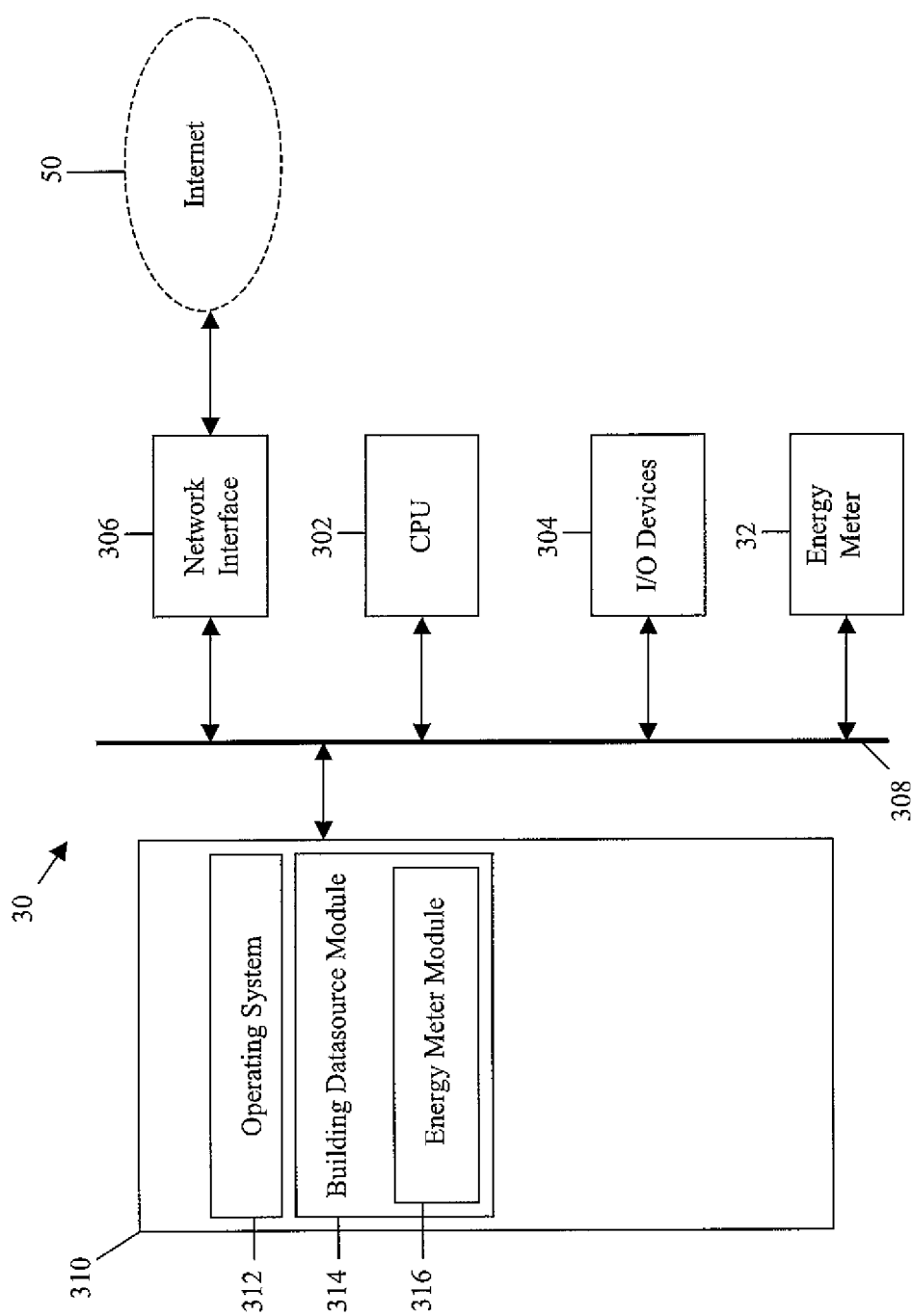
FIG. 4 illustrates an exemplary building datasource server computer architecture configured according to an embodiment of the invention.

FIG. 4 illustrates an exemplary computer architecture for a building datasource server computer 30, such as illustrated in the computer system of FIG. 1, configured in accordance with an embodiment of the present invention. Building datasource computer 30 includes standard components, including a central processing unit 302 and input/output devices 304, which are linked by a bus 308. Input/output devices 304 may comprise a keyboard, mouse, touch screen, monitor, printer, and the like, for example. A network interface 306 is also connected to the bus 308. Network interface 306 provides connectivity to a network 50, such as exemplary network 50 described above, thereby allowing building datasource computer 30 to operate in a networked environment. Building datasource 30 also comprises at least one energy meter 32 which is operable to measure energy load or consumption of at least one building energy input for a building and provide a digital signal readable by building datasource server 30. In a particular embodiment, energy meter 32 may comprise a digital electrical meter suitable to digitally measure building electrical load or consumption, for example. In other embodiments, energy meter 32 may be suitable to measure the load or consumption of one or more building energy inputs selected from the list of: electricity, gas, oil, coal, steam, water and the like.

In an optional embodiment, building datasource 30 may additionally comprise a building data storage repository (not shown) capable of storing building energy load or consumption data for one or more buildings, for example. Such optional building data storage repository may comprise a conventional data storage device such as a hard disk or solid-state memory located with and connected directly to building datasource 30 such as by bus 308 as shown in FIG. 4, or may alternately comprise a remote data storage facility accessibly connected to building datasource 30. Also connected to bus 308 is a computer-readable memory 310. The memory 310 stores executable instructions to implement functions of the present invention. The computer-readable memory 310 may comprise any available computer-readable media or storage device that can be accessed by the building datasource computer 30.

In an embodiment of the present invention, one or more of the following program modules and/or data files may be stored in the memory 310 of building datasource computer 30: an operating system module 312, a building datasource module 314, and an energy meter module 316.

Similar to module 112 described above the operating system module 312 may comprise any known executable operating system instructions, such as may be suitable for controlling the general operations of a networked building datasource 30, and in particular may comprise instructions for handling various system services, such as file services or for performing hardware dependent tasks. Operating system module 312 may also comprise instructions for standard computer operation, including receiving input from input devices such as a keyboard or mouse, and for displaying output in a graphical format on a monitor, for example. In one embodiment, operating system module 312 may comprise one or more known proprietary or open-source computer operating systems, such as for example, Windows™, MacOS™, UNIX™ or Linux™ operating systems, for example.

Building datasource module 314 comprises instructions for transmitting and/or receiving building energy load data to and/or from monitoring server 20. In particular, building datasource module 314 may comprise instructions to communicate with monitoring server 20 such as over a computer network 50 and/or another suitable connection such as connection 35, such as to transmit building energy load data for at least one building to monitoring server 20. Such building energy load data may comprise historical building energy load values as may be stored by building datasource 30 and/or current measured building energy load values as may be measured by one or more building energy meters 32 corresponding to one or more buildings, for example. In one embodiment, building datasource module 314 may comprise instructions to encrypt and/or compress building energy load data using suitable known encryption and/or compression techniques for communication with monitoring server 20, such as for the transmission of historical and/or current measured building energy load values to monitoring server 20, for example.

In an optional embodiment of the present invention, building datasource 30 may comprise a building automation system and/or building management system for one or more buildings, and in such case building datasource module 314 may also comprise instructions to access a database connected to such building automation and/or management system which stores building energy load data, and to transmit such stored building energy load data to monitoring server 20, for example. Such stored building energy load data may comprise historical building energy load values and/or current measured building energy load values, for example. In a further optional embodiment, building datasource 30 may comprise a utility company computer system storing building energy load data for multiple buildings, for example. In such further optional embodiment, building datasource module 314 may then comprise instructions to access at least one database of such utility company system to retrieve historical and/or current measured building energy load values for at least one building, such as to transmit the building energy load data to monitoring server 20.

Energy meter module 316 comprises instructions to communicate with at least one building energy meter 32, to receive measurements of building energy load and/or consumption values from one or more building energy meter 32 corresponding to at least one building. In particular, energy meter module 316 may comprise instructions to communicate with various common types of digital energy meters 32 which may be used to meter one or more building energy input (such as electricity, gas, oil, coal, steam, and water, for example), such as by use of common energy meter protocols including one or more of Modbus™, BACnet, Fieldbus and LonWorks™ communication protocols, for example. In one embodiment, energy meter module 316 comprises a building energy data "connector layer" and comprises instructions to communicate with at least one building energy meter 32 and/or stored building meter repository. Energy meter module 316 may also measure and retrieve building energy load values from said building energy meter 32 and/or repository for transmission to monitoring server 20, for example. In an optional embodiment of the present invention, energy meter module 316 may also comprise instructions to convert building energy data retrieved from building energy meter 32 and/or a building meter repository to a data format adapted for transmission to monitoring server 20, and/or adapted for use by monitoring server 20 for calculating predicted or typical building energy load values, for example.

In another embodiment of the present invention, predictor variable datasource server 40 may comprise an exemplary computer architecture substantially similar to that of building datasource server 30 as described above in reference to FIG. 4. In particular, predictor variable datasource server 40 may comprise substantially similar hardware components to those illustrated in FIG. 4 and described above. Such exemplary predictor variable datasource server 40 may also comprise a program module comprising instructions for transmitting and/or receiving predictor variable data to and/or from monitoring server 20, such as historical and/or current measured predictor variable values corresponding to one or more buildings, for example.

The above described program modules incorporate instructions to implement processing operations associated with aspects of the present invention. Various embodiments of the processing operations of the above-described program modules are described below with reference to FIG. 5. The modules stored in memory 310 are exemplary, and additional modules can be included. It should be appreciated that the functions of the presented modules may be combined. In addition, a function of a module need not be performed on a single machine. Instead, a function of a module may be distributed across a network (such as network 50 or the like) to one or more other computers if desired. It is the functions of the present invention that are significant, not where they are performed or the specific manner in which they are performed.

Figure 5:
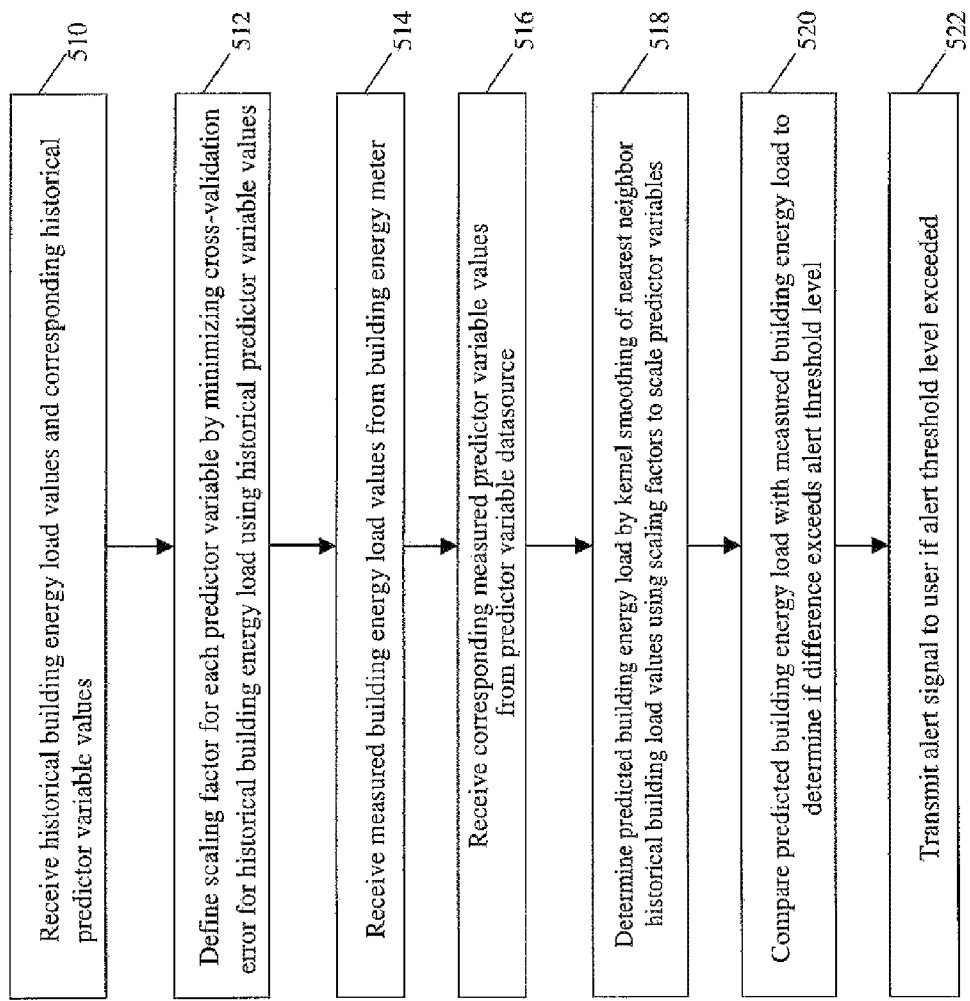
FIG. 5 illustrates a series of processing operations associated with an embodiment of the invention.

FIG. 5 illustrates a series of processing operations or methods that may be implemented by systems similar to those illustrated in FIG. 1, and the exemplary computers illustrated in FIGS. 2-4, according to an embodiment of the invention. In the first processing operation 510 of FIG. 5, historical building energy load values and corresponding historical predictor variable data comprising values for one or more predictor variables are received by monitoring server 20. In one embodiment, monitoring server module 214 may be used to implement processing operation 510, such as by receiving historical building energy load values from building datasource 30, and by receiving historical predictor variable data comprising values for multiple predictor variables that corresponds to the historical building energy load values, such as from predictor variable datasource 40, for example. The historical building energy load values and corresponding historical predictor variable values may be received by the monitoring server 20, such as over computer network 50, or optionally over alternative connection 35, according to known methods. In an alternative embodiment, the historical building energy load and predictor variable values may be received by monitoring server 20 by means of a computer-readable memory medium, such as an optical disk or solid state memory device, for example.

In one embodiment, historical building energy load values for a building may be received by monitoring server 20 from building datasource 30, representing a series of past or historical building energy load values for at least one building energy input (such as electrical, gas, oil, coal, steam and heat inputs, for example) measured by one or more building energy meters 32 associated with the building. Similarly, historical predictor variable values corresponding to the building energy load values may be received by monitoring server from predictor variable datasource 40. Historical predictor variable values may include a series of past or historical values for multiple predictor variables (such as time, day, date, temperature, humidity, wind speed, wind direction, solar radiation and occupancy, for example) corresponding to a geographical location associated with the building, such as from a weather service, for example.

In a further embodiment, processing operation 510 may additionally include storing on monitoring server 20 at least one of: historical building energy load values, historical predictor variable values, current measured building energy load values, predicted building energy load values and current predictor variable values. This step may be implemented by monitoring server module 214 to store such building energy and predictor variable values in a monitoring data storage repository 22, for example. According to one aspect of such an embodiment, monitoring server module 214 may store historical and/or current building energy load values and/or predictor variable values in monitoring data storage repository 22 as such values are received by monitoring server 20, such as from other computers over network 50, for example. According to another aspect of the present embodiment, monitoring server module 214 may also store predicted building energy load values in monitoring data storage repository 22 as they are calculated by monitoring server 20, for example.

In the second processing operation 512 of FIG. 5, a scaling factor is defined for each predictor variable by minimizing cross-validation error between the predicted and measured historical building energy load values. Processing operation 512 may be implemented using scaling factor learning module 214 on monitoring server 20, according to one embodiment of the present invention. Scaling factor learning module 214 may desirably be used to optimize calculation of predicted building energy load values by a kernel smoothing of historical building energy load values using historical predictor variable values received by monitoring server 20. In particular, scaling factor values may be determined for each of multiple predictor variables using scaling factor learning module 216, by employing a cross-validation process to iteratively minimize the difference between measured and predicted historical building energy load values. The use of arbitrary uniform or randomized starting values for scaling factors for each predictor variable may be used at the outset of operation 512 to define the scaling factors through minimizing cross-validation error. Additionally, in some embodiments, a training data set and validation data set may be defined for use in defining scaling factors according to operation 512. Such a training data set and validation data set may comprise at least a portion or subset of the historical building energy load values and corresponding historical predictor variable values received by monitoring server 20. Training data sets and validation data sets may optionally be defined automatically such as by monitoring server 20, or may be defined by selection of a user of user computer 10 such as may be received by monitoring server 20 in connection with the historical building energy load and predictor variable data.

In order to optimize the learned scaling factor values defined, scaling factor learning operation 512 may comprise the use of scaling factor learning module 216 to calculate an rms error function defining the error between measured historical building energy loads in the validation data set and predicted building energy load values calculated by kernel smoothing of historical energy load values within the training data set using their associated predictor variable values, where each predictor variable is weighted or scaled according to the scaling factor values. For example, the rms error function for the difference between historical measured building energy load values and corresponding calculated predicted building energy load values may be expressed by:

$$e_{rms} = \left( \frac{1}{N_S} \sum_{i \in S} (y_i - \hat{y}_i)^2 \right)$$

where S is the validation data set of historical building energy load values, $y_i$ is the historical measured building energy load value, and $\hat{y}_i$ is the corresponding predicted historical building energy load value.

In order to calculate the above-described rms error function, the scaling factor learning module 216 may also be used to calculate predicted values for historical building energy load values, by kernel smoothing, using a unit Gaussian kernel, of an arbitrarily selected number of nearest neighbor values of historical energy load values using predictor variable values scaled by the scaling factors. The euclidean distance in the space of the scaled predictor variables to each of the nearest neighbors is the input to the kernel function that determines the kernel weights for the kernel smoothing weighted average. For example, predicted historical building energy load values may be calculated using scaling factor learning module 216 according to the equation:

$$\hat{y} = \frac{\sum_i k(x, x_i) y_i}{\sum_i k(x, x_i)}$$

where $\hat{y}$ is the calculated predicted building energy load value for the corresponding values of predictor variables in vector x, $y_i$ are the measured historical building energy load values for the arbitrarily selected number of nearest neighbors with predictor variable vectors $x_i$ that have been scaled by the scaling factors, and $k(x, x_i)$ is the unit kernel function.

In one embodiment, scaling factor learning processing operation 512 may comprise using scaling factor learning module 216 to optimize the learned scaling factor values by iteratively minimizing the above-defined rms error function using the Levenberg-Marquardt optimization algorithm for varying the learned scaling factor values for subsequent iterations of the scaling factor learning process. Such use of the Levenberg-Marquardt algorithm for optimization of linear systems may be implemented as is known in the art. In alternative embodiments, other suitable known optimization algorithms or techniques may be implemented by scaling factor learning module 216 for iteratively optimizing learned scaling factor values in processing operation 512.

In a particular embodiment, scaling factor learning processing operation 512 may also comprise using scaling factor learning module 216 to implement a suitable known k-dimensional (or k-d) tree technique, such as a "best-bin first" k-d tree algorithm, where each of the k dimensions corresponds to a predictor variable that has been scaled by the scaling factor, to determine the nearest neighbor historical energy load values and nearest neighbor distances for a given set of predictor variable values, to be used for the kernel smoothing calculations. Such use of a k-d tree to compute the nearest neighbor historical energy load values and nearest neighbor distances may desirably be implemented to improve the speed and efficiency of calculation of predicted building energy load values. Alternatively, other suitable methods may be implemented to facilitate computation of nearest neighbor values for use in calculation of predicted building energy load values, for example.

In the next processing operation 514 of FIG. 5, monitoring server 20 receives measured building energy load values from a building energy meter 32. In one embodiment, monitoring server module 214 on monitoring server 20 may be used to implement processing operation 514, such as by receiving measured energy load values measured by at least one building energy meter 32, and transmitted to monitoring server 20 either through building datasource 30, or alternatively transmitted directly from energy meter 32 to monitoring server 20, for example. In another embodiment, current measured building energy load values may be received by monitoring server 20 for one or more buildings on an arbitrary regular periodic basis such as an hourly semi-hourly "real-time" basis, for example. In a further embodiment, processing operation 514 may also comprise storing current measured building energy values on monitoring server 20 as they are received, such as by storing such measured building energy load values on monitoring data storage repository 22, for example.

In the next processing operation 516 of FIG. 5, measured predictor variable values from predictor variable datasource 40, which correspond to the above-mentioned measured building energy load values in operation 514, are received by monitoring server 20. In one embodiment, monitoring server module 214 on monitoring server 20 may be used to implement processing operation 516, such as by receiving current measured predictor variable values for multiple predictor variables transmitted from a predictor variable datasource 40, and corresponding to the measured building energy load values received in processing operation 514 above, for example. In a particular embodiment, the current measured predictor variable values may correspond to measured building energy load values for one or more buildings, such as for one or more buildings located in the same geographical area, for example. Alternatively, measured predictor variable values may be received which correspond specifically to one individual building. Similar to as described above, current predictor variable values corresponding to one or more buildings may also be received by monitoring server 20 on an arbitrary regular periodic basis such as an hourly semi-hourly "real-time" basis as may be provided by a weather service, for example. In a further embodiment, processing operation 516 may also comprise storing current measured predictor variable values on monitoring server 20 as they are received, such as by storing such measured predictor variable values on monitoring data storage repository 22, for example. Also, as described above in reference to processing operation 510, measured predictor variable values may comprise values for predictor variables including one or more of: time, day, date, temperature, humidity, wind speed, wind direction, solar radiation and occupancy, for example.

In the next processing operation 518 of FIG. 5, predicted building load values are determined by kernel smoothing of nearest neighbor historical building load values using predictor variables that have been scaled by the scaling factors. In one embodiment, prediction module 218 on monitoring server 20 may be used to implement processing operation 518. In particular, processing operation 518 may comprise using prediction module 218 to calculate a current predicted building energy load value (also known as a typical building energy load value) which corresponds to the current measured predictor variable values received from predictor variable datasource 40, by kernel smoothing of historical building energy loads using predictor variable values received in processing operation 510 that have been scaled by the scaling factors, for example. Accordingly, prediction module 218 may be used to calculate a current predicted building energy load value for a building at a particular time, by applying a kernel smoothing of the nearest neighbor historical building energy load values using predictor variable values for that building that have been scaled using the corresponding scaling factor values for each of the multiple predictor variables.

In one embodiment, similar to as described above in reference to scaling factor learning processing operation 512, processing operation 518 may comprise using prediction module 218 to calculate a current predicted (or typical) building energy load value ŷ, for a specific vector of predictor variable values, x, according to the equation:

$$\hat{y} = \frac{\sum_i k(x, x_i) y_i}{\sum_i k(x, x_i)}$$

where ŷ is the calculated predicted building energy load value for the corresponding values of predictor variables in vector x, $y_i$ are the measured historical building energy load values for the arbitrarily selected number of nearest neighbors with predictor variable vectors $x_i$ that have been scaled by the scaling factors, and $k(x,x_i)$ is the unit kernel function. In such an embodiment, the kernel function $k(x,x_i)$ may comprise a unit Gaussian kernel. Also in such an embodiment, processing operation 518 may also comprise using prediction module 218 to implement a suitable k-d tree technique, such as the "best-bin first" k-d tree algorithm mentioned above, to determine an arbitrary number of nearest neighbor values of the historical energy load values and nearest neighbour distances using the predictor variable values scaled by the scaling factors to be used for the weighted average kernel smoothing calculations of current predicted building energy load. In one embodiment, an arbitrary number of nearest neighbor values of historical energy load values may be used for the weighted average kernel smoothing calculation, as may be determined automatically by the monitoring server, or as may be determined by a user, such as to control the duration or computing resources required to complete the kernel smoothing calculations, for example.

In a further embodiment, processing operation 518 may also comprise using prediction module 218 to calculate current predicted (or typical) building energy load values for any of one or more buildings for which historical building energy load and predictor variable values are stored by monitoring server 20. In a similar embodiment, processing operation 518 may include using prediction module 218 to periodically calculate new current predicted building energy load values for one or more buildings at arbitrary regular time intervals, thereby providing regularly updated predicted (or typical) building energy load values, that may be used for ongoing regular monitoring of building energy consumption of one or more buildings, for example.

In the next processing operation 520 of FIG. 5, monitoring server 20 is used to compare the predicted building energy load with the measured building energy load to determine if their difference exceeds an alert threshold level. In one embodiment, alert module 220 of monitoring server 20 may be used to implement processing operation 520. In a particular embodiment, an alert threshold level may be arbitrarily predetermined, either automatically such as by monitoring server 20, or by a user of user computer 10, for example. In a case where the alert threshold level is determined automatically, such as by monitoring server 20, the alert threshold level may comprise a relative comparison such as an alert level corresponding to a 10%, 25%, or 50% difference between the predicted (or typical) building energy load value and the measured building energy load value, for example, which may be automatically selected in order to reflect a likely indicator that an unusual building energy load level has been measured for a building and that an alert is therefore justified. In a case where the alert threshold level is determined by a user of user computer 10, the user may preset any desired alert threshold level such as a relative or an absolute difference between the predicted (or typical building energy load value) and measured building energy load values that is desired by the user to be used to determine if an alert is justified. Such a user-defined alert threshold level may be transmitted from the user computer 10 to the monitoring server 20, such as in conjunction with the transmission of historical building energy load values to the monitoring server 20, or in connection with selection of a training data set or validation data set or other parameters related to calculation of predicted building energy load values, which may be transmitted from user computer 10 to monitoring server 20, for example.

In an embodiment of the present invention including multiple buildings and the calculation of multiple current predicted building energy load values, processing operation 520 may also comprise using alert module 220 to compare a series of predicted or typical building energy load values for each of one or more buildings, spaced over a period of time with a series of corresponding measured building energy load values, and to represent the series of predicted values for each building as a predicted building energy load curve (also referred to as a typical building energy load curve) and the series of measured values for each building as a measured or actual building energy load curve. Processing operation 520 may further include comparison of such a predicted or typical building energy curve with a measured or actual building energy curve to determine if the difference between predicted and measured values exceeds the alert threshold level over a period of time. The period of time considered in such an embodiment may be predetermined such as automatically by monitoring server 20, or by user input from user computer 10, for example. In a further embodiment, processing operation 520 may additionally comprise using monitoring module 520 to provide such predicted (or typical) building energy load curves and measured (or actual) building energy load curves to a user computer 10, such as by means of using monitoring server module 214 on monitoring server 20 to provide the typical and actual curves to a user computer 10 in the form of a webpage and/or a web application interface such as over computer network 50, for example. In a particular such embodiment, such typical and actual building energy curves may be provided to user computer 10 in a graphical format, such as part of one or more graphical user interfaces which may be adapted for use by various users to monitor and understand variations in predicted and measured building energy use for one or more buildings under monitoring.

In the last processing operation 522 of FIG. 5, monitoring server 20 is used to transmit an alert signal to a user if an alert threshold level is exceeded. In one embodiment of the present invention, alert module 220 of monitoring server 20 may be used to implement processing operation 522. In a particular embodiment, if the difference between a predicted building energy load value and a corresponding building energy load value for a particular building exceeds the alert threshold level as described above in processing operation 520, alert module 220 may transmit an alert signal to a user, such as a user of user computer 10, for example. Such an alert signal may be transmitted to a user by any suitable means, such as over computer network 50 to user computer 10 as an email, VOIP or instant messaging alert signal for example, by a telecommunication link such as to a mobile device as a voice or text alert signal, or to a paging device or the like, for example. In another embodiment, the alert module 220 of monitoring server 20 may also transmit details of at least one of current predicted building energy load values and current measured building energy load values for a particular building corresponding to the alert signal transmitted to a user. For example, the alert module 220 may transmit an alert signal as well as a series of measured building energy load values such as an actual building energy curve, and/or a series of predicted building energy load values such as a predicted or typical curve, as described above, so that the user receiving the alert signal may also receive and review the status of predicted and actual building energy use for the building associated with the alert signal generation.

In an alternative embodiment of the present invention, the monitoring server 20 may receive scaling factor values for predictor variables as well as historical building energy load values and corresponding historical predictor variable values, such as in cases where the scaling factor values may have been previously determined for a given dataset of historical building energy load and predictor variable values. In such an alternative embodiment, processing operation 510 may include receiving defined scaling factor values for each predictor variable, and processing operation 512 may be omitted from the series of processing operations shown in FIG. 5, for example.

In a further optional embodiment of the present invention, processing operations 520 and 522 may be omitted from the series of processing operations shown in FIG. 5, and the predicted building energy load value determined according to processing operation 518 may be transmitted to a user, such as by transmission to user computer 10 for graphical display to a user, for example. In such an embodiment, a user may receive the predicted building energy load value determined by monitoring server 20, such as in a graphical representation of a time series of predicted building energy load values, such as a typical building energy load curve, or as a single predicted building energy load value for a particular time.

Figure 6:
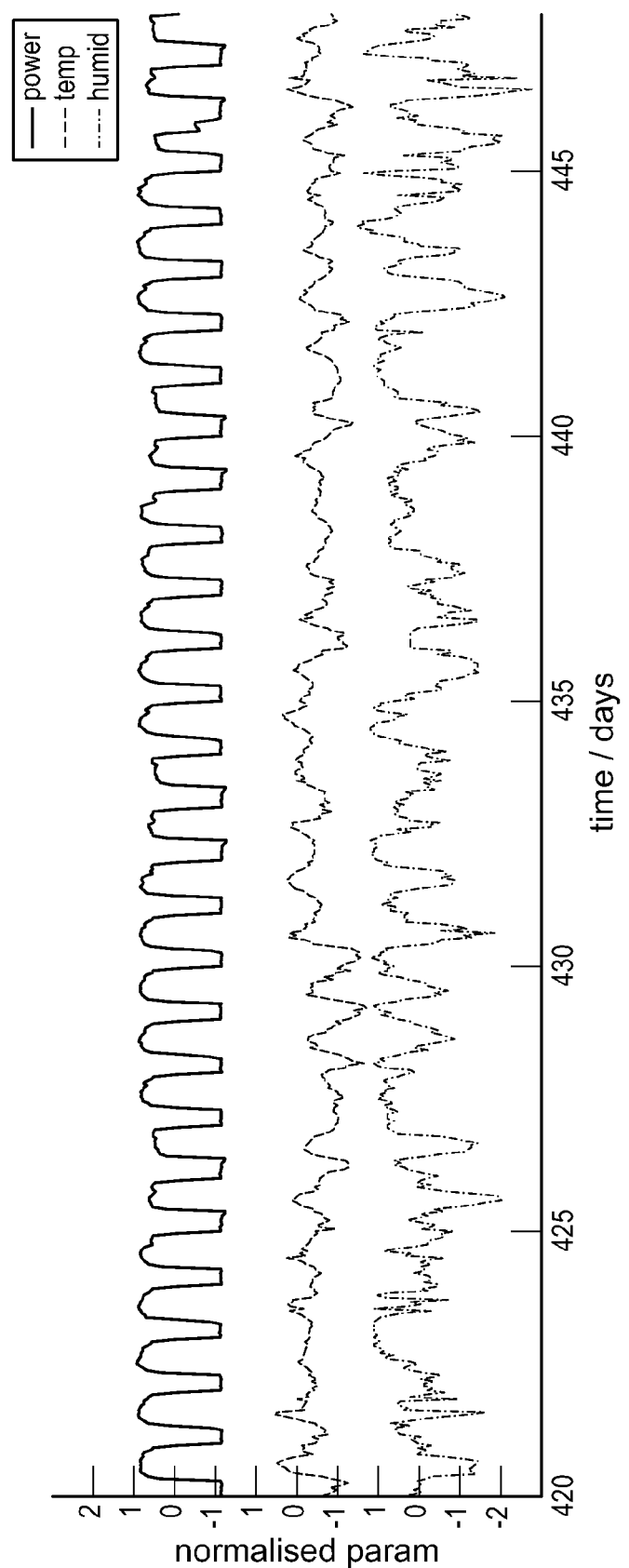
FIG. 6 illustrates an exemplary graphical time series of building energy load and predictor variable values associated with an embodiment of the invention.
Figure 7A:
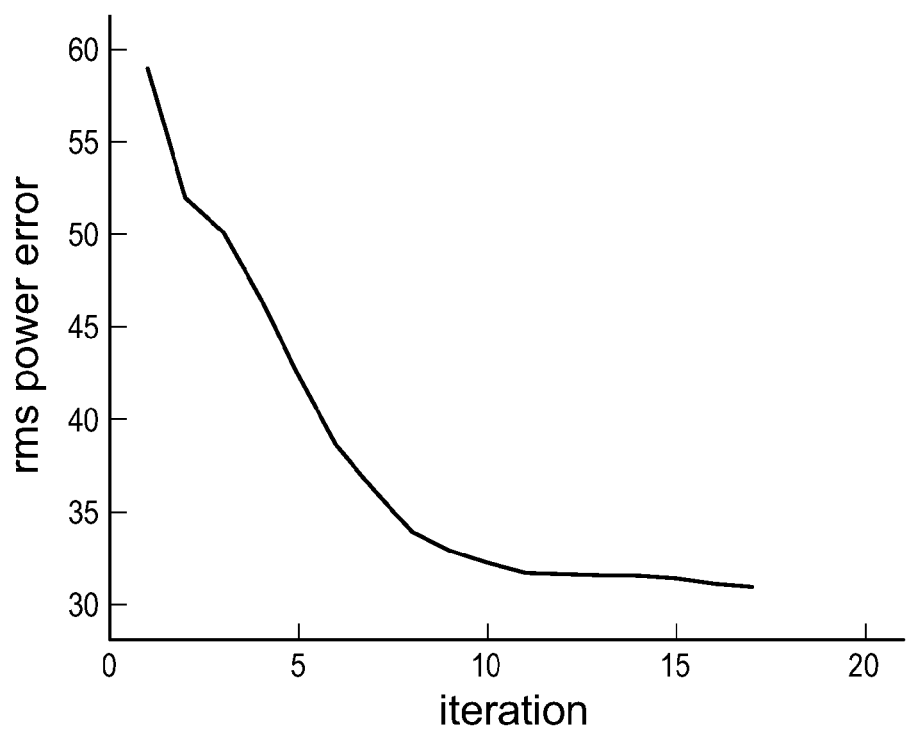
Figure 7B:
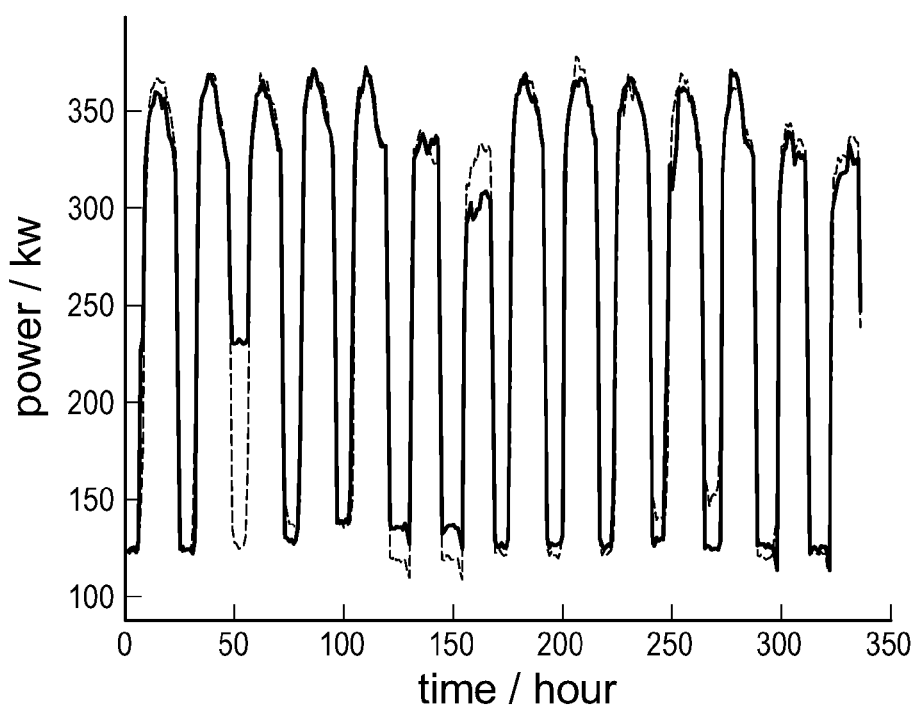
Figure 7C:
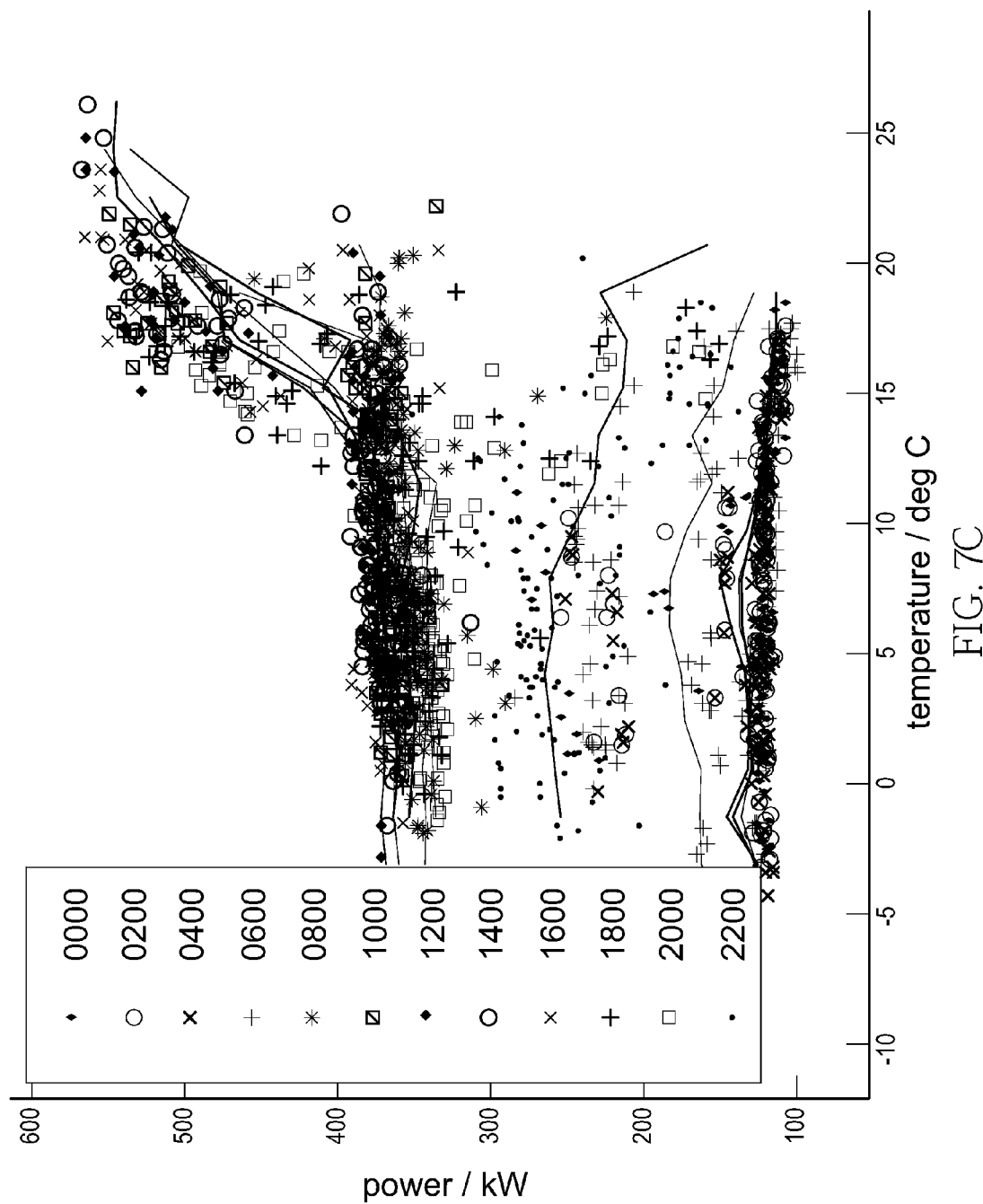
Figure 7D:
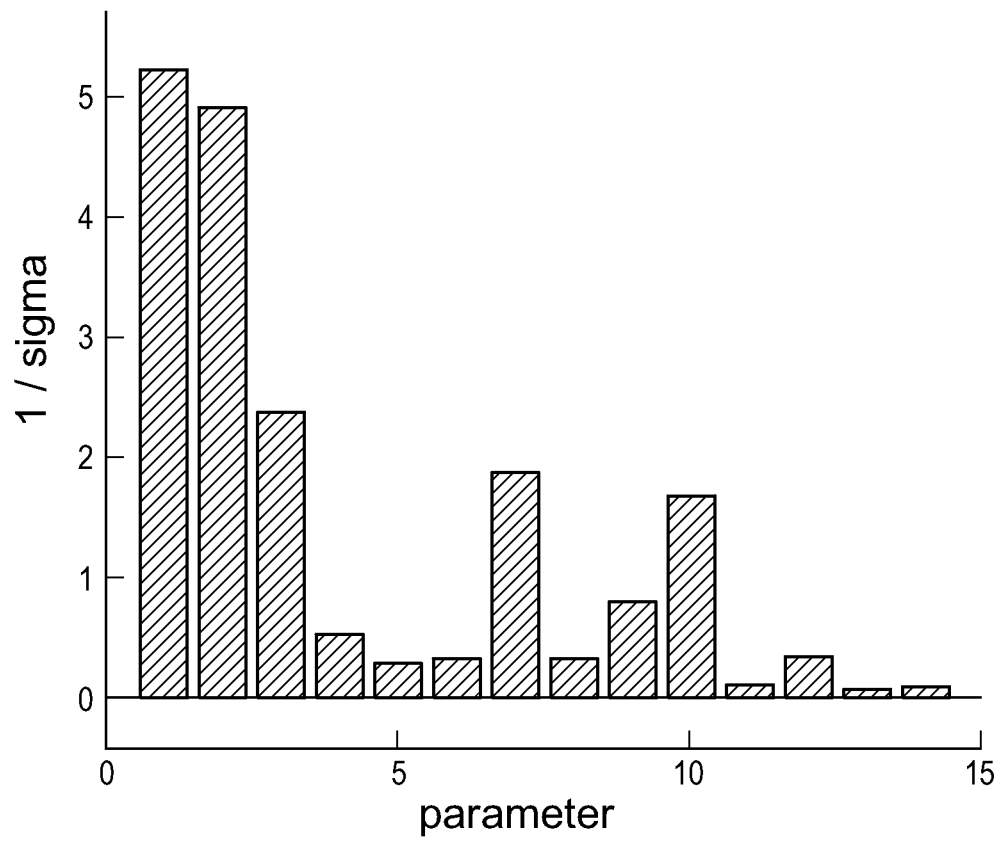

Referring to FIG. 6, a graphical representation of measured building energy load values, and predictor variable values over a period of time are shown, according to an embodiment of the present invention. In particular, FIG. 6 shows a graphical presentation of a time series of measured building energy load values 610 for a building, and also shows corresponding measured predictor variable values including temperature values 620 and humidity values 630 for the same period of time. In one embodiment, such building energy load values 610 and temperature 620 and humidity 630 predictor variable values may represent historical measured building energy load values and corresponding historical predictor variable values, such as described above in reference to FIG. 5, which may be received by monitoring server 20, for example. Such historical building energy load values and corresponding predictor variable values may be used for determining scaling factor values such as by a scaling factor learning process implemented by scaling factor learning module 216 of monitoring server 20, for example. In another embodiment, historical measured building energy load values 610 and predictor variable values 620 and 630 may also be used in a kernel smoothing operation to calculate predicted building energy load values, such as by a unit Gaussian kernel smoothing of nearest neighbor values as described above, which may be implemented by prediction module 218 of monitoring server 20, for example.

Referring to FIGS. 7A, 7B, 7C, and 7D, graphical representations of a scaling factor learning process similar to as is described above in reference to processing operation 512 is shown. According to one embodiment, a time series of measured building energy load values 720 (FIG. 7B) are shown along with predicted building energy load values 725 (FIG. 7B) calculated using a unit Gaussian kernel smoothing of nearest neighbor values of the measured building energy loads 720 and measured predictor variable values 730 (FIG. 7C) which correspond to the measured building energy load values. Also shown are values for scaling factor parameters 740 (FIG. 7D) which may be iteratively varied to optimize the prediction of building energy load values 725, according to the scaling factor learning process described above in reference to processing operation 512, and which may be implemented using scaling factor learning module 216 according to an embodiment of the invention. As the scaling factor values 740 are iteratively optimized during the scaling factor learning process, the rms building energy load error 710 (FIG. 7A) of the differences between measured building energy load values 720 and corresponding predicted building energy load values 725 is shown to decrease with such iteration, as shown in the downward trend of rms building energy load error 710 of FIG. 7A, for example. Therefore, as described above, the scaling factor learning process may provide for determining optimized values of scaling factors 740 for use in calculating predicted values of building energy load 725, according to embodiments of the invention.

An embodiment of the present invention relates to a computer storage product with a computer-readable medium having computer code thereon for performing various computer-implemented operations. The computer-readable media and computer code may be specially designed and constructed for the purposes of the present invention, or they may be of the kind well known and available to a person having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs"), ROM and RAM devices. Examples of computer code include machine code, such as produced by a compiler, and files containing higher-level code that are executed by a computer using an interpreter. For example, an embodiment of the invention may be implemented using Java, HTML/XML, JavaScript, C#, C++, or other scripting, markup and/or programming languages and development tools. Another embodiment of the present invention may be implemented in hardwired circuitry in place of, or in combination with, machine-executable software instructions.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the spirit and scope thereof. Accordingly, the scope of the invention is to be construed in accordance with the substance defined by the following claims.

What is claimed is:

1. A non-transitory computer readable medium, comprising executable instructions to:
    receive historical building energy load values and corresponding historical predictor variable data comprising values for one or more predictor variables;
    define a scaling factor for each said predictor variable by cross-validation error minimization for said historical building energy load values using said corresponding historical predictor variable values scaled by said scaling factors;
    receive measured building energy load values measured by at least one building energy meter;
    receive measured predictor variable values corresponding to the measured building energy load values from a predictor variable datasource;
    determine a predicted building energy load value by kernel smoothing of one or more nearest neighbor historical building energy load values using said historical predictor variable values each scaled by said defined scaling factors;
    compare said predicted building energy load value with said measured building energy load values to determine if an alert threshold level is exceeded; and
    transmit an alert signal to a user when said alert threshold level is exceeded.

2. The non-transitory computer readable medium according to claim 1, wherein said one or more predictor variables comprise at least one of: time, day, temperature, humidity, wind speed, wind direction, solar radiation and occupancy.

3. The non-transitory computer readable medium according to claim 1, wherein said historical building energy load values and said measured building energy load values comprise consumption load values of one or more of: electrical energy; thermal energy; natural gas; steam and water.

4. The non-transitory computer readable medium according to claim 1, additionally comprising executable instructions to:
    transmit a profile of measured building energy load values and a profile of predicted building energy load values to a user.

5. The non-transitory computer readable medium according to claim 1 wherein said kernel smoothing comprises a unit Gaussian kernel smoothing of said one or more nearest neighbor historical building energy load values using said predictor variable values each scaled by said respective defined scaling factor.

6. The non-transitory computer readable medium according to claim 1 additionally comprising executable instructions to:
determine said nearest neighbor historical building energy load values using a k-dimensional tree.

7. The non-transitory computer readable medium according to claim 1 wherein said executable instruction to define a scaling factor for each said predictor variable further comprises an executable instruction to:
define a single scaling factor for each said predictor variable by cross-validation error minimization for said historical building energy load values using said corresponding historical predictor variable values using a Levenberg-Marquardt optimization to minimize said cross-validation error between said historical building energy load values and said one or more predicted historical building energy load values.

8. The non-transitory computer readable medium according to claim 1, wherein said alert signal comprises one or more of: an electrical impulse, an audible sound, a mechanical force, a movement of an object, and a visible display.

9. A computer implemented method of building energy monitoring, said method comprising:
receiving historical building energy load values and corresponding historical predictor variable data comprising values for one or more predictor variables;
defining a scaling factor for each said predictor variable by cross-validation error minimization for said historical building energy load values using said corresponding historical predictor variable values;
receiving measured building energy load values measured by at least one building energy meter;
receiving measured predictor variable values corresponding to the measured building energy load values from a predictor variable datasource;
determining a predicted building energy load value by kernel smoothing of one or more nearest neighbor historical building energy load values using said historical predictor variable values each scaled by said respective defined scaling factors;
comparing said predicted building energy load value with said measured building energy load values to determine if an alert threshold level is exceeded; and
transmitting an alert signal to a user when said alert threshold level is exceeded.

10. The computer implemented method according to claim 9, wherein said one or more predictor variables comprise at least one of: time, day, temperature, humidity, wind speed, wind direction, solar radiation and occupancy.

11. The computer implemented method according to claim 9, wherein said historical building energy load values and said measured building energy load values comprise consumption load values of at least one of: electrical energy; thermal energy; natural gas; steam and water.

12. The computer implemented method according to claim 9, additionally comprising transmitting a profile of measured building energy load values and a profile of predicted building energy load values to a user.

13. The computer implemented method according to claim 9 wherein said kernel smoothing comprises a unit Gaussian kernel smoothing of said one or more nearest neighbor historical building energy load values using said predictor variable values each scaled by said respective defined scaling factors.

14. The computer implemented method according to claim 9, additionally comprising computing said one or more nearest neighbor historical building energy load values using a k-dimensional tree.

15. The computer implemented method according to claim 9 wherein said measured building energy load values are measured by at least one building energy meter from at least one of: a building management computer; a building management database; a building energy smart meter; and a utility database.

16. The computer implemented method according to claim 9 wherein defining a scaling factor for each said predictor variable further comprises:
defining a single scaling factor for each said predictor variable by cross-validation error minimization for said historical building energy load values and said corresponding historical predictor variable values using a Levenberg-Marquardt optimization to minimize said cross-validation error between said historical building energy load values and predicted historical building energy load values.

17. The computer implemented method according to claim 9 wherein said predictor variable datasource comprises at least one of: a weather service database; a weather station computer; an offline weather data archive; and a building occupant monitoring system.

18. The computer implemented method according to claim 9 wherein said alert signal comprises one or more of: an electrical impulse, an audible sound, a mechanical force, a movement of an object, and a visible display.

19. A computer implemented method of building energy monitoring, said method comprising:
receiving historical building energy load values and corresponding historical predictor variable data comprising values for one or more predictor variables;
receiving scaling factor values for each said predictor variable;
receiving measured building energy load values measured by at least one building energy meter;
receiving measured predictor variable values corresponding to the measured building energy load values from a predictor variable datasource;
determining a predicted building energy load value by kernel smoothing of one or more nearest neighbor historical building energy load values using said historical predictor variable values each scaled by said respective scaling factor values;
comparing said predicted building energy load value with said measured building energy load values to determine if an alert threshold level is exceeded; and
transmitting an alert signal to a user when said alert threshold level is exceeded.

20. The computer implemented method according to claim 19, wherein said one or more predictor variables comprise at least one of: time, day, temperature, humidity, wind speed, wind direction, solar radiation and occupancy.

21. The computer implemented method according to claim 19, wherein said one or more nearest neighbor historical building energy load values are determined using a k-dimensional tree.

22. The computer implemented method according to claim 19, additionally comprising transmitting a profile of said measured building energy load values and a profile of said predicted building energy load values to a user.

23. The computer implemented method according to claim 19 wherein said alert signal comprises one or more of: an electrical impulse, an audible sound, a mechanical force, a movement of an object, and a visible display.

24. A computer, comprising:
a processor that executes instructions; and
a computer-readable memory that stores instructions that cause the processor to determine parameters for building energy monitoring by:
receiving historical building energy load values and corresponding historical predictor variable data comprising values one or more predictor variables;
receiving scaling factor values for each of said predictor variables;
receiving measured building energy load values measured by at least one building energy meter;
receiving measured predictor variable values corresponding to the measured building energy load values from a predictor variable datasource;
determining a predicted building energy load value by kernel smoothing of one or more nearest neighbor historical building energy load values using said historical predictor variable values each scaled by said respective scaling factor values;
comparing said predicted building energy load value with said measured building energy load values to determine if an alert threshold level is exceeded; and
transmitting an alert signal to a user when said alert threshold level is exceeded.

25. The computer according to claim 24 wherein said one or more predictor variables comprise at least one of: time, day, temperature, humidity, wind speed, wind direction, solar radiation and occupancy.

26. The computer according to claim 24 wherein said one or more nearest neighbor historical building energy load values are determined using a k-dimensional tree.

27. The computer according to claim 24 wherein said measured building energy load values are measured by at least one building energy meter from at least one of: a building management computer, a building management database, a building energy smart meter, and a utility database.

28. The computer according to claim 24 wherein said predictor variable datasource includes at least one of: a weather service database; a weather station computer; an offline weather data archive; and a building occupant monitoring system.

29. The computer according to claim 24 wherein said alert signal comprises one or more of: an electrical impulse, an audible sound, a mechanical force, a movement of an object, and a visible display.

30. The computer according to claim 24 wherein said computer comprises one or more distributed computers communicatively connected by a computer network.

* * * * *